(12) United States Patent
Chen (10) Patent No.: US 11,710,175 B2
(45) Date of Patent: Jul. 25, 2023

(54) HEAT PUMP RENTAL MANAGEMENT SYSTEM AND MANAGEMENT METHOD THEREOF

(71) Applicant: TOP STANDPIPE CO., LTD., Taoyuan (TW)

(72) Inventor: Chia-Hua Chen, Taoyuan (TW)

(73) Assignee: TOP STANDPIPE CO., LTD., Taoyuan (TW)

( * ) Notice: Subject to any disclaimer, the term of this patent is extended or adjusted under 35 U.S.C. 154(b) by 0 days.

(21) Appl. No.: 17/409,745

(22) Filed: Aug. 23, 2021

(65) Prior Publication Data
US 2022/0101422 A1 Mar. 31, 2022

(30) Foreign Application Priority Data
Sep. 30, 2020 (TW) .................................. 109134050

(51) Int. Cl.
*G06Q 30/02* (2023.01)
*G06Q 30/0645* (2023.01)
*G06Q 50/06* (2012.01)

(52) U.S. Cl.
CPC ......... *G06Q 30/0645* (2013.01); *G06Q 30/02* (2013.01); *G06Q 50/06* (2013.01)

(58) Field of Classification Search
CPC ..... G06Q 30/0645; G06Q 30/02–0277; G06Q 50/06
See application file for complete search history.

(56) References Cited

U.S. PATENT DOCUMENTS

| 10,242,349 | B1* | 3/2019 | Arya | G06Q 50/06 |
| 2016/0076950 | A1* | 3/2016 | Jacquet | G01K 17/10 |
| | | | | 702/182 |

FOREIGN PATENT DOCUMENTS

| JP | 2010002157 A | * | 1/2010 | |
| WO | WO-2018061015 A2 | * | 4/2018 | G01N 33/18 |

OTHER PUBLICATIONS

IP.com titled Energy Savings by Use of Water Heater to Compliment Solar Water Heaters as a Hybrid design by Japheth Sang Kiptoo published on Aug. 22, 2022, 2022 IEEE PES/IAS Power Africa (pp. 1-5) (Year: 2022).*

* cited by examiner

*Primary Examiner* — Raquel Alvarez
(74) *Attorney, Agent, or Firm* — Chun-Ming Shih; HDLS IPR Services (57) ABSTRACT

A heat pump rental management system includes a detector, a transmission unit, a cloud server, a deduction unit and an electronic apparatus. The detector detects one of a temperature, a water flow rate, a pressure, and a power consumption of a heat pump apparatus. The cloud server receives the temperature, the water flow rate, the pressure, and the power consumption of the heat pump apparatus through the transmission unit, and the cloud server generates a rental fee according to a rate corresponding to account information.

7 Claims, 4 Drawing Sheets

HEAT PUMP RENTAL MANAGEMENT SYSTEM AND MANAGEMENT METHOD THEREOF

BACKGROUND

Technical Field

The present disclosure relates to a heat pump rental management system and a management method thereof, in particular to a heat pump rental management system and a management method thereof with functions of automatic monitoring, deduction and repair dispatch.

Description of Related Art

A demand for domestic water in modern life is getting higher and higher. In terms of hot water demand, especially for hairdressing and beauty businesses, travel-related businesses, medical institutions or nursing homes, etc., the demand for hot water amount is usually increased or decreased suddenly in response to the service demand. Generally, it is necessary to control the demand for hot water by relying on its rule of thumb or established operating methods. However, some service industries still only provide passive service due to unawareness of client need or wrong assessment. This result in following problems: unstable hot water supply, shortage of hot water during the course of shampooing action, high maintenance cost, manual billing wasting time and prone to errors.

For this reason, how to design a heat pump rental management system and a management method thereof, especially to solve the technical problems aforementioned of a related art is an important subject studied by the inventors of this application.

SUMMARY

One purpose of the present disclosure is to provide a heat pump rental management system, which solves technical problems of unstable hot water supply, high maintenance costs of hot water equipment, and manual billing that consumes a lot of time and is prone to errors, thus achieve a purpose of effectively improving hot water supply management and reducing maintenance costs and time.

In order to achieve the purpose aforementioned, the heat pump rental management system of the present disclosure includes: a heat pump apparatus, a water flow rate detector, a transmission unit, and a cloud server. The heat pump apparatus is used for generating hot water. The water flow rate detector detects a water flow rate of the heat pump apparatus. The transmission unit is communicatively connected to the water flow rate detector, and transmits the water flow rate of the heat pump apparatus. The cloud server is communicatively connected to the transmission unit, and receives the water flow rate of the heat pump apparatus through the transmission unit. The cloud server includes a user management module, an expense calculation module, and a rental billing module. The user management module is used for a rental user who uses the heat pump apparatus to create or manage account information. The expense calculation module generates a rental fee based on the water flow rate of the heat pump apparatus and based on a first rate corresponding to the account information. The rental billing module generates rental bill information based on the rental fee.

Further, the heat pump rental management system further includes a power detector. The power detector detects a total power consumption of the heat pump apparatus. The expense calculation module generates a power consumption fee based on the total power consumption of the heat pump apparatus and based on a second rate corresponding to the account information. The rental billing module subtracts the power consumption fee from the rental fee to generate the rental bill information.

Further, the heat pump rental management system further includes a deduction unit and a first electronic apparatus. The deduction unit is communicatively connected to the cloud server, and when the deduction unit receives the rental bill information from the cloud server, the deduction unit automatically deducts fee from the rental user. The first electronic apparatus is communicatively connected to the cloud server, and the first electronic apparatus allows the rental user to access at least one of the account information, the rental fee, and the rental bill information.

Further, the first electronic apparatus further includes a rental user interface, the rental user accesses at least one of the account information, the rental fee, and the rental bill information through a rental user interface.

Further, the cloud server further includes an environment detector, a monitoring and warning module, and a matching module. The environment detector detects at least one of a temperature and a pressure of the heat pump apparatus, and when the monitoring and warning module detects that at least one of a temperature, a water flow rate, a pressure, and a power consumption of the heat pump apparatus is abnormal, the monitoring and warning module generates warning information. The matching module matches a plurality of maintenance companies in a geographic area where the heat pump apparatus is located according to the warning information; after the matching module receives at least one confirmation notification from at least one of the plurality of maintenance companies in sequence, the matching module outputs a matching notification to the rental user of the heat pump apparatus, a provider of the heat pump apparatus, and the maintenance company issuing the confirmation notification first.

Another purpose of the present disclosure is to provide a management method for heat pump rental, which solves technical problems of unstable hot water supply, high maintenance costs of hot water equipment, and manual billing that consumes a lot of time and is prone to errors, thus achieve a purpose of effectively improving hot water supply management and reducing maintenance costs and time.

In order to achieve the another purpose aforementioned, the management method for heat pump rental of the present disclosure includes the following steps: detecting a water flow rate of the heat pump apparatus; creating or managing account information for a rental user of the heat pump apparatus; generating a rental fee based on the water flow rate of the heat pump apparatus and based on a first rate corresponding to the account information; and generating a rental bill information based on the rental fee.

Further, the management method for heat pump rental further includes the following steps: detecting a total power consumption of the heat pump apparatus; generating a power consumption fee based on the total power consumption of the heat pump apparatus and based on a second rate corresponding to the account information; and generating the rental bill information by subtracting the power consumption fee from the rental fee.

Further, the management method for heat pump rental further includes the following steps: deducting fee from the rental user automatically when the rental bill information is received; and providing a rental user interface to allow the rental user to access at least one of the account information, the rental fee, and the rental bill information.

Further, the management method for heat pump rental further includes the following steps: detecting at least one of a temperature and a pressure of the heat pump apparatus; generating warning information when detecting that at least one of a temperature, a water flow rate, a pressure, and a power consumption of the heat pump apparatus is abnormal; matching a plurality of maintenance companies in a geographic area where the heat pump apparatus is located according to the warning information; after receiving at least one confirmation notification from at least one of the plurality of maintenance companies in sequence, outputting a matching notification to the rental user of the heat pump apparatus, a provider of the heat pump apparatus, and the maintenance company issuing the confirmation notification first.

More another purpose of the present disclosure is to provide a computer-readable medium stored in a heat pump rental management system, the computer-readable medium executes any of the aforementioned management method of the heat pump rental management system.

When using the heat pump rental management system and management method thereof of the present disclosure, the plurality of sensors of the present disclosure detect at least one of a temperature, a water flow rate, a pressure, and a power consumption of the heat pump apparatus in real time, and the cloud server automatically analyzes data, generates the rental fee and the rental bill information, etc., and the cloud server completes a deduction action through the deduction unit automatically. For users, since the heat pump apparatus is rented, there is no economic pressure of buying out the entire equipment. A maintenance costs that increase day by day with the aging of equipment in related art may be avoided. Besides, data analysis, anomaly detection, and even deductions and bill generation actions are completed automatically in the present disclosure; therefore, it may also avoid situations such as unclear current situation of customer occurring in traditional hot water management methods, unstable hot water supply due to evaluation error, and shortage of hot water before completing shampooing action. Since deductions and bill generation do not require manual processing in the present disclosure, management also avoids increased labor costs, poor timeliness, and reduces disputes arising from manual processing.

For this reason, the heat pump rental management system and management method thereof of the present disclosure solves technical problems of unstable hot water supply, high maintenance costs of hot water equipment, and manual billing that consumes a lot of time and is prone to errors, thus achieve a purpose of effectively improving hot water supply management and reducing maintenance costs and time.

In order to further understand the techniques, means, and effects of the present disclosure for achieving the intended purpose. Please refer to the following detailed description and drawings of the present disclosure. The drawings are provided for reference and description only, and are not intended to limit the present disclosure.

DETAILED DESCRIPTION

The technical content and detailed description of the present disclosure will be described below in conjunction with the drawings.

Figure 1:
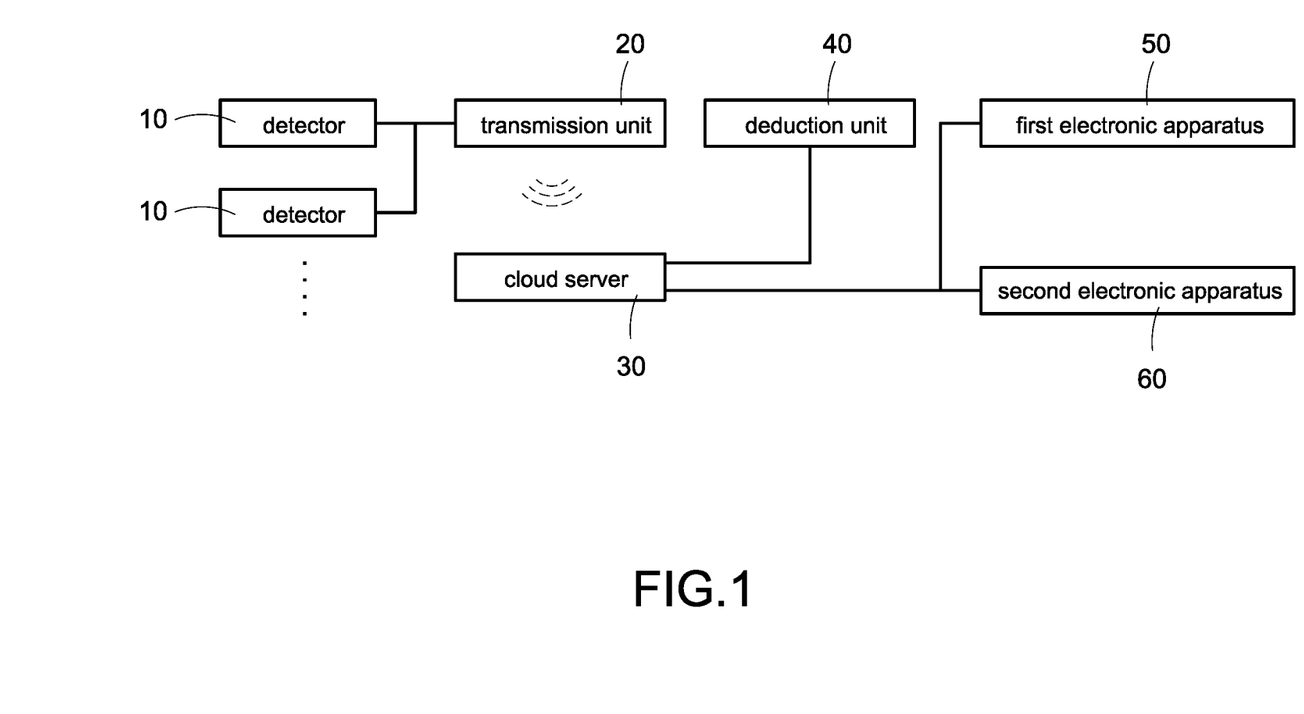
FIG. 1 and FIG. 2 are schematic diagrams of an architecture of a heat pump rental management system of the present disclosure.
Figure 2:
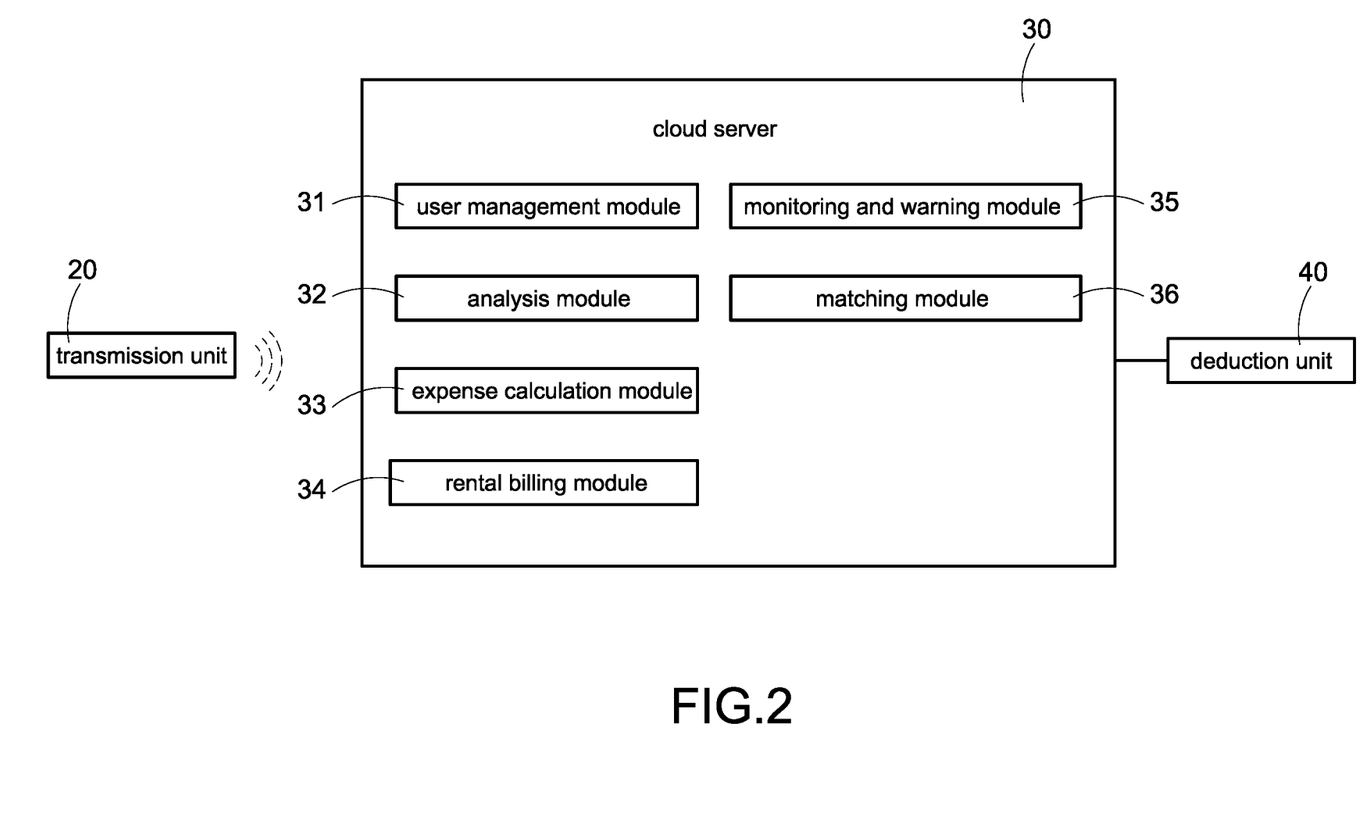

Please refer to FIG. 1 and FIG. 2, which are schematic diagrams of an architecture of a heat pump rental management system of the present disclosure.

In an embodiment of the present disclosure, the heat pump rental management system includes a plurality of detectors 10, a transmission unit 20, a cloud server 30, a deduction unit 40, and a first electronic apparatus 50. Each detector 10 detects at least one of a temperature, a water flow rate, a pressure, and a power consumption of the heat pump apparatus (not shown). The detector 10 may be an electronic sensing unit such as a temperature detector, a water flow detector, a pressure detector, or a power detector. The transmission unit 20 is communicatively connected to the plurality of detectors 10, and transmits at least one of the temperatures, the water flow rate, the pressure, and the power consumption of the heat pump apparatus. The water flow rate in the present disclosure may be either a water flow rate for cold water used or a water flow rate for hot water used of the heat pump apparatus.

The transmission unit 20 may be a router. The router may include offline storage units (such as SDXC cards, CF cards, etc.) not shown in the figure for storing data obtained from the plurality of detectors 10 when a network is unstable. Moreover, the transmission unit 20 is communicatively connected to the plurality of detectors 10 through communication protocols such as RS-485 or modbus, but the present disclosure is not limited thereto. The cloud server 30 is communicatively connected to the transmission unit 20, and receives at least one of the temperature, the water flow rate, the pressure, and the power consumption of the heat pump apparatus through the transmission unit 20.

The cloud server 30 includes a user management module 31, an analysis module 32, an expense calculation module 33, and a rental billing module 34. The user management module 31 is used for a renting user (not shown) who uses the heat pump apparatus to create or manage account information (not shown). The user management module 31 may be a web page or an application program. The analysis module 32 analyzes at least one of the temperatures, the water flow rate, the pressure, and the power consumption of the heat pump apparatus, and generates analysis information (not shown) including at least one of the temperatures, the water flow rate, the pressure, and the power consumption of the heat pump apparatus. The analysis module 32 may be composed of a microcontroller (MCU) and/or an application program (App). The expense calculation module 33 generates a rental fee (not shown) based on the analysis information and a fee rate corresponding to the account information. The rental billing module 34 generates rental bill information (not shown) based on the rental fee.

Further, the expense calculation module 33 generates the rental fee (that is, a total water fee) based on the water flow rate of the heat pump apparatus and based on a first rate (that is, a water fee per unit or a unitary water fee) corresponding to the account information. The expense calculation module 33 generates a power consumption fee (that is, the total electricity cost) based on a total power consumption of the heat pump apparatus and a second rate (that is, an electricity fee per unit or a unitary electricity fee) corresponding to the account information. The rental billing module 34 subtracts the power consumption fee (i.e., a total electricity bill) from the rental fee (i.e., a total water bill) to generate the rental bill information. It may be regarded as a business model in which the total electricity bill is used to subsidize a rent of heat pump apparatus based on business considerations. In first embodiment of the present disclosure, for providers of heat pump installations or the heat pump rental management system, they may incorporate water flow rate, power consumption, rental fees, and power consumption fees into a database with big data based on their own business model for analysis. For example, it is possible to determine whether there is a regular change in a time period of the rental user of the heat pump apparatus based on the water flow rate of the heat pump apparatus (such as a seasonal change of sales volume), and a rate (that is, the water fee per unit) is adjusted according to its own business model. The present disclosure is not limited thereto.

The deduction unit 40 is communicatively connected to the cloud server 30. When the deduction unit 40 receives the rental bill information from the cloud server 30, the deduction unit 40 automatically deducts fee from the rental user. The deduction unit 40 may be a partial component of an account provider (for example, a bank's ATM or electronic online banking, etc.).

The first electronic apparatus 50 is communicatively connected to the cloud server 30, and the first electronic apparatus 50 further includes a rental user interface, the rental user accesses at least one of the account information, the rental fee, and the rental bill information through a rental user interface (which may be a web page or an application program). The first electronic apparatus 50 may be an electronic apparatus with isometric communication function of a computer or a mobile phone for the rental user to access at least one of the account information, the rental fee, and the rental bill information through the web page or the application program installed on the computer or the mobile phone.

Further, the cloud server 30 further includes a monitoring and warning module 35, and a matching module 36. When the monitoring and warning module 35 detects that at least one of a temperature, a water flow rate, a pressure, and a power consumption of the heat pump apparatus is abnormal, the monitoring and warning module 35 generates warning information (not shown). The matching module 36 matches a plurality of maintenance companies in a geographic area (such as XX city, XX district) where the heat pump apparatus is located (i.e., precise address or latitude and longitude coordinate) according to the warning information. After the matching module 36 receives at least one confirmation notification from at least one of the pluralities of maintenance companies in sequence, the matching module 36 outputs a matching notification to the rental user of the heat pump apparatus, a provider of the heat pump apparatus, and the maintenance company issuing the confirmation notification first. That is, one of the maintenance companies may know his opportunity to obtain an opportunity for maintenance services beforehand, and prepare maintenance materials and tools in advance. Besides, the rental user may know which one of the maintenance companies may come to repair the heat pump apparatus in advance. The rental user may even know the maintenance time and maintenance method of coming, etc. (this information may be provided in a confirmation notice by one of the maintenance companies).

In first embodiment of the present disclosure, for providers of heat pump installations or the heat pump rental management system, they may incorporate the warning information, name of a maintenance company who has repaired the heat pump apparatus, and the water flow rate, the power consumption, the rental fee and the power consumption fee into a database with big data based on their own business model for analysis. For example, it may analyze whether an operation of the heat pump apparatus is normal or not (for example, the operation may be abnormal when the water flow rate has not changed but the power consumption is increasing) based on the water flow rate, the power consumption and the warning information of the heat pump apparatus. It may also analyze whether the warning information truly alerts the actual changing trend of the water flow rate and the power consumption. It may analyze the difference between pre-maintenance heat pump apparatus and post-maintenance heat pump apparatus, and differences between different maintenance companies based on the information of the list of the maintenance companies (which have repaired the heat pump apparatus), the water flow rate and power consumption of the heat pump apparatus, thus regulate and manage a quality of the maintenance companies. A list of maintenance companies may be managed and adjusted (for example, to eliminate maintenance companies with bad maintenance records in the database) based on the business model of the provider of the heat pump rental management system. However, the present disclosure is not limited thereto.

Further, the heat pump rental management system may further include a second electronic apparatus 60 that is communicatively connected to the cloud server 30. The second electronic apparatus 60 provides at least one of warning information, repair costs, multiple repair evidence, and repair bill information for repair operators (as maintenance companies), rental users, and heat pump apparatus providers to access through a maintenance provider interface (which may be a web page or application program). The second electronic apparatus 60 may be an electronic apparatus with isometric communication function of a computer or a mobile phone for maintenance operators, rental users, and heat pump apparatus providers to access at least one of warning information, repair costs, multiple repair evidence, and repair bill information.

Figure 3:
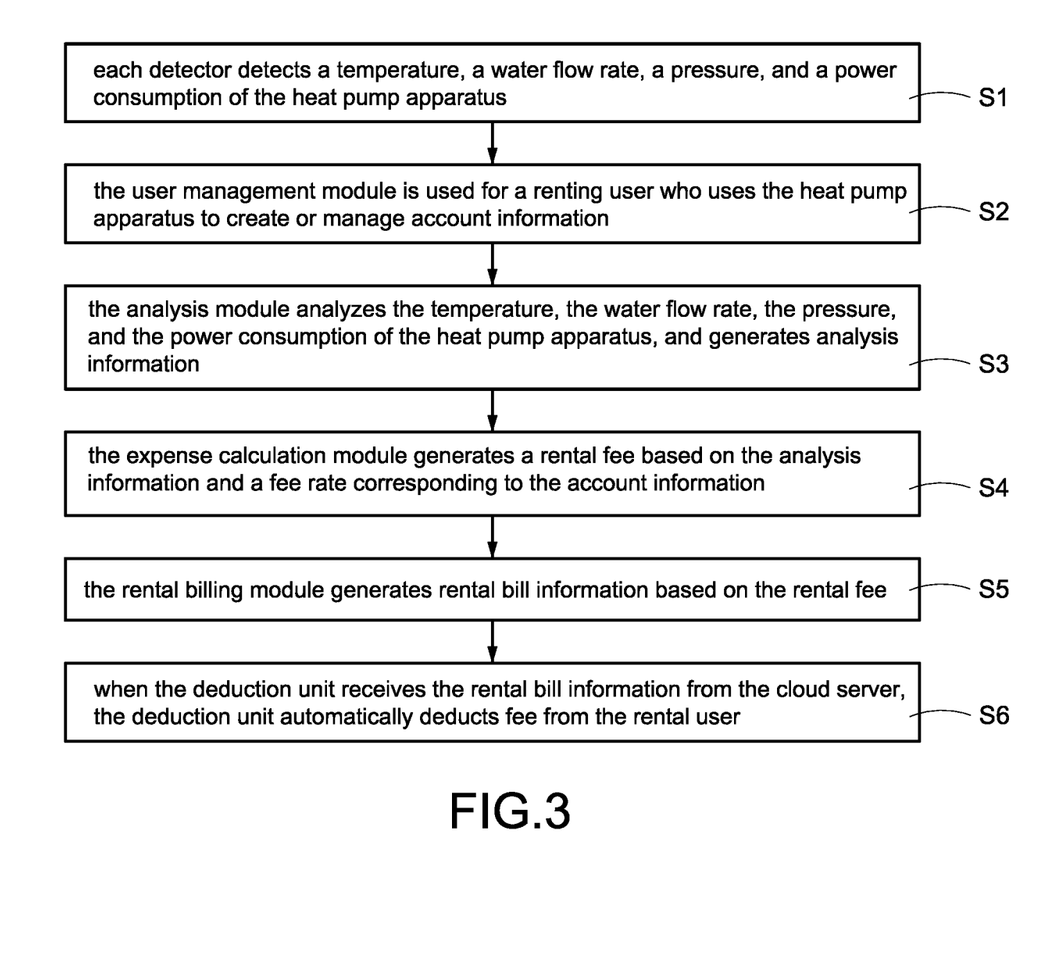
FIG. 3 and FIG. 4 are flowcharts of a management method for heat pump rental of the present disclosure.
Figure 4:
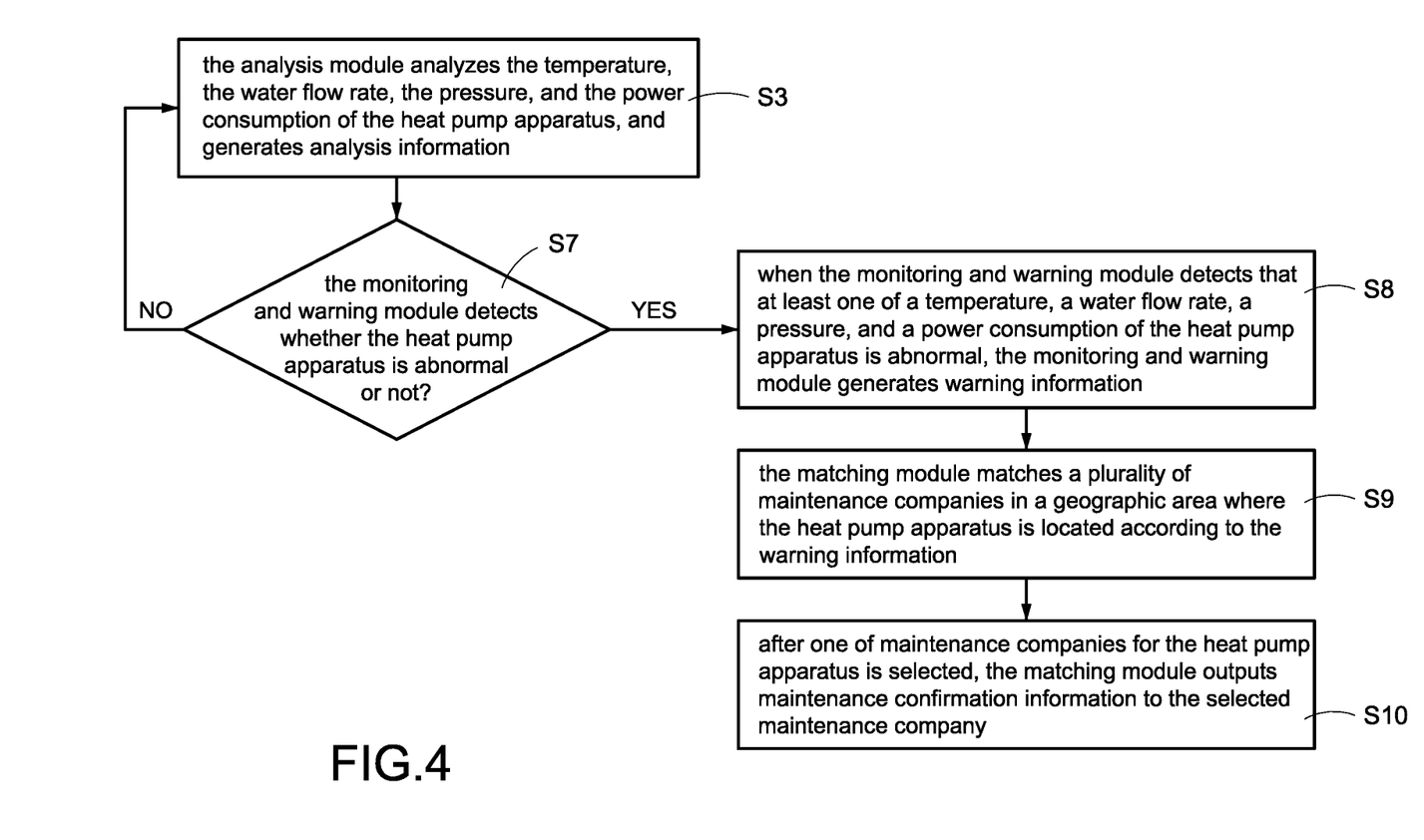

Please refer to FIG. 3 and FIG. 4, which are flowcharts of a management method for heat pump rental of the present disclosure. Please refer to FIG. 1 and FIG. 2 for other component symbols.

When using the heat pump rental management system and management method thereof of the present disclosure, each detector 10 detects a temperature, a water flow rate, a pressure, and a power consumption of the heat pump apparatus (step S1). The user management module 31 is used for a renting user who uses the heat pump apparatus to create or manage account information (step S2). The analysis module 32 analyzes the temperature, the water flow rate, the pressure, and the power consumption of the heat pump apparatus, and generates analysis information (step S3). The expense calculation module 33 generates a rental fee based on the analysis information and a fee rate corresponding to the account information (step S4). The rental billing module 34 generates rental bill information based on the rental fee (step S5). When the deduction unit 40 receives the rental bill information from the cloud server 30, the deduction unit 40 automatically deducts fee from the rental user (step S6).

Further, after the aforementioned step S3, the monitoring and warning module 35 detects whether the heat pump apparatus is abnormal or not (step S7). When the monitoring and warning module 35 detects that at least one of a temperature, a water flow rate, a pressure, and a power consumption of the heat pump apparatus is abnormal, the monitoring and warning module 35 generates warning information (step S8). The matching module 36 matches a plurality of maintenance companies in a geographic area where the heat pump apparatus is located according to the warning information (step S9). After one of maintenance companies for the heat pump apparatus is selected, the matching module 36 outputs maintenance confirmation information to the selected maintenance company (step S10) for the notified maintenance company to confirm dispatch of maintenance personnel and maintenance tasks.

The plurality of sensors of the present disclosure detects at least one of a temperature, a water flow rate, a pressure, and a power consumption of the heat pump apparatus in real time, and the cloud server 30 automatically analyzes data, generates the rental fee and the rental bill information, etc., and the cloud server 30 completes a deduction action through the deduction unit 40 automatically. For users, since the heat pump apparatus is rented, there is no economic pressure of buying out the entire equipment. A maintenance costs that increase day by day with the aging of equipment in related art may be avoided. Besides, data analysis, anomaly detection, and even deductions and bill generation actions are completed automatically in the present disclosure; therefore, it may also avoid situations such as unclear current situation of customer occurring in traditional hot water management methods, unstable hot water supply due to evaluation error, and shortage of hot water before completing shampooing action. Since deductions and bill generation do not require manual processing in the present disclosure, management also avoids increased labor costs, poor timeliness, and reduces disputes arising from manual processing.

For this reason, the heat pump rental management system and management method thereof of the present disclosure solves technical problems of unstable hot water supply, high maintenance costs of hot water equipment, and manual billing that consumes a lot of time and is prone to errors, thus achieve a purpose of effectively improving hot water supply management and reducing maintenance costs and time.

The above is only a detailed description and drawings of the preferred embodiments of the present disclosure, but the features of the present disclosure are not limited thereto, and are not intended to limit the present disclosure. All the scope of the present disclosure shall be subject to the scope of the following claims. The embodiments of the spirit of the present disclosure and its similar variations are intended to be included in the scope of the present disclosure. Any variation or modification that may be easily conceived by those skilled in the art in the field of the present disclosure may be covered by the following claims.

It should be understood that the structures, the proportions, the sizes, the number of components, and the like in the drawings are only used to cope with the contents disclosed in the specification for understanding and reading by those skilled in the art, and it is not intended to limit the conditions that may be implemented in the present disclosure, and thus is not technically significant. Any modification of the structure, the change of the proportional relationship, or the adjustment of the size, should be within the scope of the technical contents disclosed by the present disclosure without affecting the effects and the achievable effects of the present disclosure.

What is claimed is:

1. A heat pump rental management system comprising:
    a heat pump apparatus, used for generating hot water;
    a water flow rate detector, configured to detect a water flow rate of the heat pump apparatus;
    a transmission unit, connected to the water flow rate detector through RS-485 or modbus, and configured to transmit the water flow rate of the heat pump apparatus, wherein the transmission unit comprises an offline storage unit for temporarily storing data obtained from the water flow rate detector when network is unstable;
    a cloud server, communicatively connected to the transmission unit, and configured to receive the water flow rate of the heat pump apparatus through the transmission unit, the cloud server comprising a user management module, an expense calculation module, a rental billing module, an environment detector, a monitoring and warning module, and a matching module; and
    a power detector, configured to detect a total power consumption of the heat pump apparatus;
    wherein, the user management module is configured for a rental user of the heat pump apparatus to create or manage account information; the expense calculation module is configured to generate a rental fee based on the water flow rate of the heat pump apparatus and based on a first rate corresponding to the account information and to generate a power consumption fee based on the total power consumption of the heat pump apparatus and a second rate corresponding to the account information; the rental billing module is configured to subtract the power consumption fee from the rental fee to generate rental bill information;
    wherein, the environment detector is configured to detect at least one of a temperature and a pressure of the heat pump apparatus, and the monitoring and warning module is configured to generate warning information when detecting that at least one of the temperature, the water flow rate, the pressure, and a power consumption of the heat pump apparatus is abnormal; and
    wherein, the matching module is configured to locate the heat pump apparatus through a precise address or a latitude and longitude coordinate of the heat pump apparatus and to match a plurality of maintenance companies in a geographic area where the heat pump apparatus is located according to the warning information, after receiving at least one confirmation notification from at least one of the plurality of maintenance companies in sequence, the matching module outputs a matching notification to the rental user of the heat pump apparatus, a provider of the heat pump apparatus, and the maintenance company issuing the confirmation notification first.

2. The heat pump rental management system in claim 1, further comprising a deduction unit and a first electronic apparatus; wherein the deduction unit is communicatively connected to the cloud server, and when the deduction unit receives the rental bill information from the cloud server, the deduction unit automatically deducts fee from the rental user; the first electronic apparatus is communicatively connected to the cloud server, and the first electronic apparatus allows the rental user to access at least one of the account information, the rental fee, and the rental bill information.

3. The heat pump rental management system in claim 2, wherein the first electronic apparatus further comprises a rental user interface, the rental user accesses at least one of the account information, the rental fee, and the rental bill information through the rental user interface.

4. A management method for heat pump rental, applied to a heat pump apparatus, the management method comprising the following steps:

detecting a water flow rate of the heat pump apparatus by a water flow rate detector;
detecting a total power consumption of the heat pump apparatus by a power detector;
creating or managing account information for a rental user of the heat pump apparatus through a user management module of a cloud server;
receiving the water flow rate and the total power consumption of the heat pump apparatus by a transmission unit connected with the water flow rate detector and the power detector through RS-485 or modbus, and temporarily storing the water flow rate and the total power consumption of the heat pump apparatus in an offline storage unit when network is unstable;
receiving the water flow rate and the total power consumption from the transmission unit by the cloud server;
generating a rental fee based on the water flow rate of the heat pump apparatus and a first rate corresponding to the account information, and a power consumption fee based on the total power consumption of the heat pump apparatus and a second rate corresponding to the account information by an expense calculation module of the cloud server;
generating rental bill information by subtracting the power consumption fee from the rental fee by a rental billing module of the cloud server;
detecting at least one of a temperature and a pressure of the heat pump apparatus by an environment detector;
generating warning information when detecting that at least one of the temperature, the water flow rate, the pressure, and a power consumption of the heat pump apparatus is abnormal by a monitoring and warning module of the cloud server; and
locating, by a matching module of the cloud server, the heat pump apparatus through a precise address or a latitude and longitude coordinate of the heat pump apparatus and matching a plurality of maintenance companies in a geographic area where the heat pump apparatus is located according to the warning information, wherein after receiving at least one confirmation notification from at least one of the plurality of maintenance companies in sequence, the matching module outputs a matching notification to the rental user of the heat pump apparatus, a provider of the heat pump apparatus, and the maintenance company issuing the confirmation notification first.

5. The management method for heat pump rental in claim 4, further comprising the following steps:
deducting fee from the rental user automatically when the rental bill information is received; and
providing a rental user interface to allow the rental user to access at least one of the account information, the rental fee, and the rental bill information.

6. A non-transitory computer-readable medium recorded with computer executable program codes, when a computer of a heat pump rental management system executes the computer executable program codes, executing a management method comprising:
detecting a water flow rate of the heat pump apparatus by a water flow rate detector;
detecting a total power consumption of the heat pump apparatus by a power detector;
creating or managing account information for a rental user of the heat pump apparatus through a user management module of a cloud server;
receiving the water flow rate and the total power consumption of the heat pump apparatus by a transmission unit connected with the water flow rate detector and the power detector through RS-485 or modbus, and temporarily storing the water flow rate and the total power consumption of the heat pump apparatus in an offline storage unit when network is unstable;
receiving the water flow rate and the total power consumption from the transmission unit by the cloud server;
generating a rental fee based on the water flow rate of the heat pump apparatus and a first rate corresponding to the account information, and a power consumption fee based on the total power consumption of the heat pump apparatus and a second rate corresponding to the account information by an expense calculation module of the cloud server;
generating rental bill information by subtracting the power consumption fee from the rental fee by a rental billing module of the cloud server;
detecting at least one of a temperature and a pressure of the heat pump apparatus by an environment detector;
generating warning information when detecting that at least one of the temperature, the water flow rate, the pressure, and a power consumption of the heat pump apparatus is abnormal by a monitoring and warning module of the cloud server; and
locating, by a matching module of the cloud server, the heat pump apparatus through a precise address or a latitude and longitude coordinate of the heat pump apparatus and matching a plurality of maintenance companies in a geographic area where the heat pump apparatus is located according to the warning information, wherein after receiving at least one confirmation notification from at least one of the plurality of maintenance companies in sequence, the matching module outputs a matching notification to the rental user of the heat pump apparatus, a provider of the heat pump apparatus, and the maintenance company issuing the confirmation notification first.

7. A non-transitory computer-readable medium recorded with computer executable program codes, when a computer of a heat pump rental management system executes the computer executable program codes, executing a management method comprising:
detecting a water flow rate of the heat pump apparatus by a water flow rate detector;
detecting a total power consumption of the heat pump apparatus by a power detector;
creating or managing account information for a rental user of the heat pump apparatus through a user management module of a cloud server;
receiving the water flow rate and the total power consumption of the heat pump apparatus by a transmission unit connected with the water flow rate detector and the power detector through RS-485 or modbus, and temporarily storing the water flow rate and the total power consumption of the heat pump apparatus in an offline storage unit when network is unstable;
receiving the water flow rate and the total power consumption from the transmission unit by the cloud server;
generating a rental fee based on the water flow rate of the heat pump apparatus and a first rate corresponding to the account information, and a power consumption fee based on the total power consumption of the heat pump apparatus and a second rate corresponding to the account information by an expense calculation module of the cloud server;

generating rental bill information by subtracting the power consumption fee from the rental fee by a rental billing module of the cloud server;

detecting at least one of a temperature and a pressure of the heat pump apparatus by an environment detector;

generating warning information when detecting that at least one of the temperature, the water flow rate, the pressure, and a power consumption of the heat pump apparatus is abnormal by a monitoring and warning module of the cloud server;

locating, by a matching module of the cloud server, the heat pump apparatus through a precise address or a latitude and longitude coordinate of the heat pump apparatus and matching a plurality of maintenance companies in a geographic area where the heat pump apparatus is located according to the warning information, wherein after receiving at least one confirmation notification from at least one of the plurality of maintenance companies in sequence, the matching module outputs a matching notification to the rental user of the heat pump apparatus, a provider of the heat pump apparatus, and the maintenance company issuing the confirmation notification first;

deducting fee from the rental user automatically when the rental bill information is received; and providing a rental user interface to allow the rental user to access at least one of the account information, the rental fee, and the rental bill information.

* * * * *